United States Patent [19]

Denzinger et al.

[11] Patent Number: 4,647,396
[45] Date of Patent: Mar. 3, 1987

[54] COPOLYMERS FOR DETERGENTS AND CLEANING AGENTS

[75] Inventors: Walter Denzinger, Speyer; Heinrich Hartmann, Limburgerhof; Albert Hettche, Hessheim; Ulrich Kaluza, Neckargemuend; Johannes Perner, Neustadt; Christos Vamvakaris, Kallstadt, all of Fed. Rep. of Germany

[73] Assignee: BASF Aktiengesellschaft, Ludwigshafen, Fed. Rep. of Germany

[21] Appl. No.: 703,614

[22] Filed: Feb. 21, 1985

[30] Foreign Application Priority Data

Jul. 18, 1984 [DE] Fed. Rep. of Germany ....... 3426368

[51] Int. Cl.$^4$ .................. C11D 3/37; C08F 22/20; C08F 22/04
[52] U.S. Cl. .................. 252/174.24; 526/271; 526/287; 526/318.2
[58] Field of Search ............ 526/318.2, 287, 271; 252/174.24

[56] References Cited

U.S. PATENT DOCUMENTS

| | | | |
|---|---|---|---|
| 3,839,215 | 10/1974 | Mulders | 252/181 |
| 3,853,781 | 12/1974 | Haschke et al. | 252/132 |
| 4,314,044 | 2/1982 | Hughes et al. | 526/318.2 |
| 4,520,165 | 5/1985 | Zabrocki | 525/84 |
| 4,557,852 | 12/1985 | Schulz | 252/174.24 |
| 4,559,159 | 12/1985 | Denzinger | 252/174.24 |

FOREIGN PATENT DOCUMENTS

| | | | |
|---|---|---|---|
| 25551 | 3/1981 | European Pat. Off. | 252/174.24 |
| 2444974 | 9/1975 | Fed. Rep. of Germany | 252/174.24 |
| 2616261 | 11/1977 | Fed. Rep. of Germany | 252/174.24 |
| 2910133 | 9/1980 | Fed. Rep. of Germany | 252/174.24 |
| 3140383 | 4/1983 | Fed. Rep. of Germany | |
| 3316513 | 11/1984 | Fed. Rep. of Germany | 252/174.24 |

OTHER PUBLICATIONS

Angewandte Chemie, 87, (1975) vol. 4, pp. 115–142.
Phosphatsubstitute and Phosphatfrie Waschmittel im Lichte der Patentliteratur; Chemiker-Zeitung, 96, (1972), pp. 695–691.

*Primary Examiner*—C. Warren Ivy
*Attorney, Agent, or Firm*—Oblon, Fisher, Spivak, McClelland & Maier

[57] ABSTRACT

The invention relates to copolymers as ingredients for detergents and cleaning agents, which contain monoethylenically unsaturated mono- and dicarboxylic acids, their hydroxyalkyl esters and, if appropriate, other ethylenically unsaturated compounds as monomer units, and are distinguished by a particular calicum-binding and magnesium-binding capacity, detergents and cleaning agents containing these copolymers, and their use in detergents and cleaning agents, in particular as sequestering agents and anti-redeposition agents.

6 Claims, No Drawings

COPOLYMERS FOR DETERGENTS AND CLEANING AGENTS

BACKGROUND OF THE INVENTION

1. Field of the Invention

The invention relates to copolymers as ingredients for detergents and cleaning agents, which contain monoethylenically unsaturated mono- and dicarboxylic acids, their hydroxyalkyl esters and, if appropriate, other ethylenically unsaturated compounds as monomer units and are distinguished by a special calcium-binding and magnesium-binding capacity, detergents and cleaning agents containing these copolymers, and their use in detergents and cleaning agents, in particular as sequestering agents and antiredeposition agents.

2. Description of the Prior Art

It is known that, in addition to surfactants, so-called builders are required as ingredients in the detergent and cleaning agent industry. One of the objects of these builders is the trapping (sequestration) of cations which form water-insoluble salts, especially calcium and magnesium. These builders are therefore also referred to specifically as sequestering agents. Previously, large amounts of phosphates, especially pentasodium triphosphate, were used for this purpose. However, extremely large amounts of phosphate-containing effluents which were discharged resulted in pronounced eutrophication of bodies of water, which led to excessive growth of algae and hence to a reduction in the oxygen content of the bodies of water. Legislation in many countries is therefore directed toward the complete prohibition of phosphates or the specification of very low maximum amounts in detergents.

A large number of proposals for solving these problems have been made over the past few years. Reference may be made to the reviews in Angew. Chemie 87 (1975), pages 115–123 and in Chemikerzeitung 96 (1972), pages 685–691. According to these publications, a large number of low molecular weight and high molecular weight compounds known to be complex formers have been tested, and it has been found that polymers based on acrylic acid and derivatives of acrylic acid which contain hydroxyl groups were very suitable for partially replacing phosphates. German Laid-Open Application DOS No. 2,161,727 describes, for example, a process for the sequestration of metal ions by means of poly-$\alpha$-hydroxyalkylates or their derivatives. According to Angew. Chemie, Loc. cit., such polymers have a calcium-binding capacity of 228 mg of CaO/g at 20° C., and of 182 mg of CaO/g at 90° C. However, a disadvantage of these compounds is that they are relatively difficult to obtain and have a relatively poor calcium-binding capacity.

German Published Application DAS No. 2,025,238 likewise discloses polymers which contain hydroxyl groups and carboxyl groups and which are obtained by so-called oxidative polymerization of acrolein, if appropriate together with acrylic acid or derivatives thereof, and subsequent treatment of the polymer or copolymer by the Cannizzaro method. In the case of these polymers too, the binding capacity does not exceed 300 mg of $CaCO_3$/g of active substance.

U.S. Pat. No. 4,314,044 describes a process for the preparation of relatively low molecular weight, water-soluble polymers by polymerization in aqueous solution using a special catalyst system consisting of a water-soluble initiator, a tertiary amine and a metal salt, and mentions in a general way the use of the polymers thus prepared as sequestering agents and scale inhibitors in detergents. The monomers mentioned include acrylic acid and methacrylic acid, which can be polymerized with 5 to 50% by weight of, for example, itaconic acid, maleic acid, hydroxyethyl methacrylate, hydroxypropyl methacrylate, hydroxyethyl acrylate, hydroxypropyl acrylate and other acrylyl derivatives and their mixtures. In the Examples, homopolymers and, in two cases only, binary copolymers of acrylic acid and hydroxyethyl methacrylate are described.

German Published Application DAS No. 2,616,261 describes copolymers of acrylic acid and/or methacrylic acid with hydroxyalkyl acrylates having 2 to 4 C. atoms per hydroxyalkyl group which possess a good calcium-binding capacity at room temperature. However, at temperatures of up to 95° C. which prevail under the washing conditions, the calcium-binding and magnesium-binding capacities of these compounds too are inadequate by present standards.

German Laid-Open Application DOS No. 3,140,383 describes the preparation of copolymers of monocarboxylic acids, dicarboxylic acids, such as acrylic acid, methacrylic acid and maleic acid and a further monomer in an amount of 0.5 to 5% by weight, such as, for example, vinyl acetate, butyl acrylate or hydroxypropyl acrylate, and their use in detergents and cleaning agents. There is no example using hydroxypropyl acrylate. Incidentally, these copolymers too have an inadequate calcium-binding and magnesium-binding capacity, in particular at elevated temperatures.

SUMMARY OF THE INVENTION

It is therefore the object to find a water-soluble polymer which contains carboxyl groups, can be easily prepared and in particular has a high calcium-binding capacity at elevated temperatures, so that it is capable of replacing phosphates in an outstanding manner.

This object is achieved by copolymers consisting of (a) 5 to 40% by weight of at least one monoethylenically unsaturated monocarboxylic acid having 3 to 10 C atoms, (b) 5 to 40% by weight of at least one monoethylenically unsaturated dicarboxylic acid having 4 to 6 C atoms, (c) 30 to 80% by weight of at least one hydroxyalkyl ester, having 2 to 6 C atoms in the hydroxyalkyl group, of monoethylenically unsaturated mono- and/or dicarboxylic acids according to (a) and/or (b) and (d) 0 to 10% by weight of one or more monoethylenically unsaturated monomers which are free of carboxyl groups and are copolymerizable with the monomers (a), (b) and (c), the percentages in each case being based on the weight of the monomers, and their water-soluble salts.

At elevated temperatures, in particular in the range from 50° to 95° C., the novel copolymers according to the invention have a calcium-binding and magnesium-binding capacity which is substantially superior to that of the agents known hitherto, such as the copolymers of German Published Application DAS No. 2,616,261. Furthermore, they are good antiredeposition inhibitors.

DESCRIPTION OF THE PREFERRED EMBODIMENTS

As effective ingredients in detergents and cleaning agents, they are used, in particular, in the form of the water-soluble ammonium salts or organic amine salts, in particular the salts of trialkylamines with alkyl radicals of 1 to 4 C atoms, or the salts of mono- or di- and/or trialkanolamines having 1 to 4 C atoms in the alkanol radical, such as di- and triethanolamine, or the alkali metal salts. The potassium and sodium salts are preferred. For use in practice, as a rule 20 to 100%, preferably 50 to 100%, of the carboxyl groups are neutralized.

Examples of starting monomers (a) are vinylacetic acid, allylacetic acid, propylideneacetic acid, ethylidenepropionic acid, α-ethylacrylic acid and β,β-dimethylacrylic acid and their mixtures. The preferred ethylenically unsaturated monocarboxylic acids (a) are acrylic acid and methacrylic acid and their mixtures.

The preferably used amount of ethylenically unsaturated monocarboxylic acids (a) is 10 to 30% by weight.

Examples of starting monomers (b) are mesaconic acid, fumaric acid, methylenemalonic acid and citraconic acid. The preferred dicarboxylic acids are maleic acid and itaconic acid and their mixtures.

The preferably used amount of ethylenically unsaturated dicarboxylic acids (b) is 10 to 30% by weight.

The hydroxyalkyl ester groups of the monomers (c) are derived from, for example, alkanediols, such as ethane-1,2-diol, propane-1,3-diol and propane-1,2-diol and their industrial mixtures, and butane-1,4-diol, butane-1,3-diol and butane-2,3-diol and their mixtures. Starting monomers (c) which may be mentioned specifically are, for example, hydroxyethyl methacrylate, hydroxypropyl methacrylate, hydroxyethyl monomaleate, hydroxyethyl dimaleate, hydroxypropyl monomaleate, hydroxypropyl dimaleate, hydroxybutyl monomaleate, hydroxybutyl dimaleate and hydroxyethyl monoitaconate. The hydroxyalkyl esters of the monoethylenically unsaturated dicarboxylic acids are to be understood as meaning the mono- and diesters.

The preferred hydroxyalkyl esters (c) are hydroxyethyl acrylate, butane-1,4-diol monoacrylate and the hydroxypropyl acrylates. The particularly preferred hydroxyalkyl esters (c) are the hydroxypropyl acrylates, and the isomer mixtures of 2-hydroxy-1-propyl acrylate and 1-hydroxy-2-propyl acrylate, which are prepared by the reaction of acrylic acid with propylene oxide, are of particular industrial importance. The preferred amounts of a hydroxyalkyl ester from (a) and/or (b) are 40 to 70 % by weight.

Starting monomers (d), which it is not absolutely necessary to include as copolymerized units, are further monomers which are copolymerizable with the monomers (a), (b) and (c), free of carboxyl groups and preferably water-soluble. Examples of suitable compounds are acrylamide, methacrylamide, 2-acrylamido-2-methylpropanesulfonic acid, vinylsulfonic acid, allylsulfonic acid, vinylphosphonic acid, allylphosphonic acid, vinyl acetate, vinyl propionate, acrylonitrile, methacrylonitrile, diethylaminoethyl (meth)acrylate, methyl (meth)acrylate, vinylpyrrolidone, vinylformamide, vinylimidazole and mixtures of these with one another. Sulfonic acid and phosphoric acid groups present as copolymerized units can, as stated above, also be neutralized. Advantageously, the monomers (d) are present as copolymerized units in an amount of 1 to 10% by weight.

Of particular interest are the copolymers with vinyl acetate and vinyl propionate which, after partial or complete elimination of acetic acid or propionic acid, contain vinyl alcohol units. In order to eliminate the vinyl ester groups, acid hydrolysis, as described in, for example, Houben-Weyl, Methoden der Organischen Chemie, volume XIV/2, pages 700–703, 1963 Georg Thieme Verlag Stuttgart, is preferred, in order to avoid hydrolysis of the acrylic and/or maleic hydroxyalkyl ester groups.

The preparation of the copolymers according to the invention is carried out in a conventional manner by suspension polymerization, precipitation polymerization or solution polymerization, solution polymerization in aqueous solution constituting a preferred method.

In the case of suspension polymerization, the copolymerization is carried out in solvents in which the monomers are at most partially soluble and the copolymers are insoluble and are therefore precipitated. It is necessary to add a protective colloid to prevent the formation of aggregates. Examples of suitable solvents are straight-chain and branched aliphatic and cycloaliphatic hydrocarbons, but any other solvent which meets the stated requirements can also be used. For example, pentane, hexane, heptane, octane, isooctane, cyclohexane, methylcyclohexane, dimethylcyclohexane and diethylcyclohexane may be preferably mentioned, cyclohexane, methylcyclohexane and isooctane being particularly preferred. Suitable protective colloids for preventing aggregate formation are polymeric substances which are readily soluble in the solvents, do not undergo any reaction with the monomers and are highly hydrophilic. Examples of suitable substances are copolymers of maleic anhydride with vinyl alkyl ethers having 10 to 20 C atoms in the alkyl radical, or with olefins having 8 to 20 C atoms and their derivatives which carry, on the maleic acid units, one or two ester groups of $C_{10}$–$C_{20}$-alcohols or one or two amide groups of $C_{10}$–$C_{20}$-alkylamines, and polyalkyl vinyl ethers whose alkyl groups contain 1 to 20 C atoms, such as, for example, polymethyl, polyethyl and polyisobutyl vinyl ether, which are furthermore preferred. The amounts of protective colloid added are usually 0.05 to 4% by weight (calculated on the basis of monomers used), preferably 0.1 to 2%, it frequently being particularly advantageous to combine several protective colloids. The K values of the stated protective colloids are in the range from 20 to 100, measured in a 1% strength by weight solution in cyclohexane at 25° C.

In the case of precipitation polymerization, the copolymerization is carried out in solvents in which the monomers are soluble and the polymers are then insoluble and are precipitated. Suitable solvents for this purpose are alkyl-substituted benzene hydrocarbons or aliphatic halohydrocarbons and mixtures of these; however, it is also possible to use any other solvent which meets the stated requirements. Examples of solvents which may be preferably mentioned are toluene, p-xylene, m-xylene, o-xylene and their industrial mixtures, ethylbenzene, diethylbenzene, methylethylbenzene, methylene chloride, 1,1- and 1,2-dichloroethane, 1,1,1-trichloroethane, 1,1,2-trichloroethylene, 1,1,2-trichloroethane, perchloroethylene, 1,2-dichloropropane, butyl chloride, 1,1,2-trichloro-1,2,2-trifluoroethane, 1,1,1,2-tetrachloro-2,2-difluoroethane and 1,1,2,2-tetrachloro-1,2-difluoroethane, toluene, xylene in the form of its industrial mixtures, 1,1,1-trichloroethane and the stated fluorochlorohydrocarbons being particularly preferred, and toluene being of particular industrial interest.

When carrying out precipitation polymerization, too, it is frequently advantageous, particularly when concentrations of 50% and higher are used, to add a protective colloid to prevent formation of aggregates. Suitable protective colloids are the same polymeric substances which have been described further above as being useful for suspension polymerization. Furthermore, the amounts of protective colloid used are usually of the same order of magnitude as that stated above.

For suspension and precipitation polymerization, the following common criteria apply:

The monomer concentrations during the polymerization are between 20 and 70%, preferably 30 and 60% by weight, calculated on the basis of the total weight of the reaction mixture.

To obtain copolymers having low residual contents of monomeric dicarboxylic acid or monomeric dicarboxylic anhydride, at least $\frac{1}{3}$ of the dicarboxylic acid or of the dicarboxylic anhydride is initially taken together with the solvents or diluents in the reactor, and the remaining dicarboxylic acid or dicarboxylic anhydride is introduced in the course of $\frac{2}{3}$ of the feed time for the monocarboxylic acid. In general, it is advantageous if the total amount of the dicarboxylic acid or its anhydride is intially taken in the reactor. The monocarboxylic acid must always be fed in, feed times of 2 to 10 hours, preferably 3 to 7 hours, being required. The hydroxyalkyl esters and, where relevant, the comonomer which is free of carboxyl groups can be initially taken either completely or partially, or can be metered in together with the monocarboxylic acid, the latter procedure being preferred.

The polymerization temperature is between 50° and 180° C., it being advantageous to carry out the principal reaction at temperatures from 50° to 100° C. in order to obtain copolymers having medium K values, and then, in order to complete the polymerization, to increase the temperatures to not more than 180° C. to achieve low residual contents of monomeric dicarboxylic acid.

Suitable free radical initiators are those which have a half life of less than 3 hours at the temperatures selected. If polymerization is begun, for example, at a low temperature and completed at an elevated temperature, it is necessary to employ at least 2 initiators. For example, the following initiators are suitable for the stated polymerization temperatures:

Temperature: 50° to 60° C.:
Acetylcyclohexanesulfonyl peroxide, diacetyl peroxydicarbonate, dicyclohexyl peroxydicarbonate, di-2-ethylhexyl peroxydicarbonate, tert.-butyl perneodecanoate and 2,2'-azobis-(4-methoxy-2,4-dimethylvaleronitrile).

Temperature: 70° to 80° C.:
Tert.-butyl perpivalate, dioctanoyl peroxide, dilauroyl peroxide and 2,2'-azobis-(2,4-diemthylvaleronitrile).

Temperature: 90° to 100° C.:
Dibenzoyl peroxide, tert.-butyl per-2-ethylhexanoate, tert.-butyl permaleate and 2,2-azobis-(isobutyronitrile).

Temperature: 110° to 120° C.:
Bis-(tert.-butylperoxy)-cyclohexane, tert.-butyl peroxyisopropyl carbonate and tert.-butyl peracetate.

Temperature: 130° to 140° C.:
2,2-Bis-(tert.-butylperoxy)-butane, dicumyl peroxide, di-tert.-amyl peroxide and di-tert.-butyl peroxide.

Temperature: 150° C.:
p-Menthane hydroperoxide, pinane hydroperoxide, cumene hydroperoxide and tert.-butyl hydroperoxide.

By the concomitant use of redox coinitiators, for example benzoin, dimethylaniline and complexes and salts of heavy metals, such as copper, cobalt, manganese, iron, nickel and chromium, which are soluble in organic solvents, it is possible to reduce the half lives of the stated peroxides, in particular of the hydroperoxides, so that, for example, tert.-butyl hydroperoxide is effective in the presence of 5 ppm of copper(II) acetylacetonate at as low as 100° C.

Apparatuses which are suitable for the polymerization are conventional stirred kettles, for example those having anchor stirrers, paddle stirrers, impeller stirrers or multi-stage impulse countercurrent agitators. Particularly suitable apparatuses are those which permit direct isolation of the solid product after the polymerization, such as, for example, paddle driers.

The polymer suspensions obtained can be dried directly in evaporators, such as belt driers, paddle driers, spray driers and fluidized-bed driers. However, it is also possible to separate off the polymers from the major part of the solvents by filtration or centrifuging and, if necessary, to remove residues of initiator, monomers and protective colloids by washing with fresh solvents, and only then to carry out drying.

After the drying procedure, and especially when the polymerization is carried out in the presence of protective colloids, the copolymers are usually obtained in the form of fine powders, which frequently can be mixed directly with the detergent powders or granules. However, it is often advantageous to convert the copolymer powders to salts by mixing with alkali metal carbonates and/or alkali metal hydroxides, and only then to mix them with the detergents.

By adding water and subsequently distilling off the solvent with steam, it is also possible to obtain, from the copolymer suspensions, aqueous polymer solutions which can, as required, then be neutralized with alkali, amines, alkanolamines or ammonia.

Solution polymerizations can be carried out in, for example, acetone, methyl ethyl ketone, tetrahydrofuran, dioxane, methanol, ethanol, n-propanol, isopropanol, n-butanol, sec.-butanol, tert.-butanol or mixtures of these with one another or mixtures with water. When alcohols are used, it is advantageous to employ the dicarboxylic acids (b) in the acid form, since the anhydrides may react with the alcohols to give the monoesters.

In solution polymerization in aqueous solution, which is preferred, the procedure is, as a rule, as follows: first, an aqueous solution of the dicarboxylic acid (b), its alkali metal salt or its anhydride is initially taken. The pH value of this solution can vary within wide limits, preferably between 2 and 10. Thereafter, the monocarboxylic acid (a) or its alkali metal salt and the initiator, advantegeously likewise in aqueous solution, are added in the course of 3 to 10 hours, preferably 5 to 8 hours. The hydroxyalkyl esters (c) and, if appropriate, one or more monomers (d) which are free of carboxyl groups can be initially taken either completely or partially, or, as is preferred, can be metered in together with the monocarboxylic acid (a).

In a particularly preferred embodiment, 20 to 80%, preferably 30 to 70%, of the carboxylic acid groups of (a) and (b) are neutralized. This can be effected by employing the dicarboxylic acids, or some of them, in the form of their salts, and the monocarboxylic acids in free form. However, the reverse procedure can also be adopted, and the dicarboxylic acids used in free from or, where possible, as anyhdrides, and the monocarboxylic acids in the form of their salts. In any case, it must be ensured that the ratio of free acids to the salts corresponds to a total degree of neutralization within the range stated above. In this context, sodium hydroxide solution and potassium hydroxide solution are preferred for the neutralization.

The solution polymerization is carried out in the presence of free radical initiators. Suitable initiators for this purpose are both those which are poorly water-soluble and those which are readily water-soluble. Examples of poorly water-soluble initiators which may be mentioned are the per and azo compounds already listed for suspension and precipitation polymerization. Examples of suitable water-soluble initiators, which are particularly important industrially, are hydrogen peroxide, peroxydisulfates, especially Na and ammonium peroxydisulfate, and azo-bis-(2-aminopropane) hydrochloride. Hydrogen peroxide is preferably used, and a mixture of hydrogen peroxide and a peroxydisulfate in a weight ratio of 3:1 to 1:3 is very particularly preferred. The initiators are employed in an amount of 0.5 to 5% by weight, based on the sum of the monomers. It is sometimes advantageous to employ combinations of poorly water-soluble initiators with readily water-soluble initiators, such as, for example, hydrogen peroxide and tert.-butyl perpivalate or potassium persulfate and 2,2'-azobis-(isobutyronitrile).

In the case of solution polymerization in an aqueous medium, the concentration of the monomers is advantageously chosen so that the aqueous solution contains 20 to 70% by weight, preferably 40 to 60% by weight of total monomers. The reaction temperature can be varied within wide limits; advantageously, temperatures between 60° and 150° C., preferably 100° to 130° C., are chosen. Where the reaction is carried out at above the boiling point of water, pressure vessels, such as autoclaves, are chosen as reaction vessels.

Furthermore, it is possible to use the regulators conventionally employed in free radical polymerizations, for example sulfur compounds, such as thioglycolic acid or 2-mercaptoethanol, and/or $C_1$–$C_4$-aldehydes, such as butyraldehyde and/or secondary alcohols, such as isopropanol or sec.-butanol, or chain extenders, such as methylenebisacrylamide or divinylglycol, these being used in amounts of 0.1 to 10, preferably 0.5 to 5% by weight, based on the sum of the monomers.

The copolymers according to the invention have K values of 8 to 100, and preferably K values of 20 to 80. The K value is determined on 2% strength by weight solutions of the sodium salts of completely neutralizable copolymers in water at 25° C. The K value is described in H. Fikentscher, Cellulosechemie, 14, 58 to 64 and 71 to 74 (1932). $K = k.10^3$.

The copolymers prepared in this manner can be dried in a conventional manner, for example by spray drying, and obtained in solid form. However, they can also be further processed in the form of the aqueous solution obtained. In this context, it is often advantageous to neutralize up to 100% of the carboxyl groups after the polymerization. Preferred neutralizing agents are alkali metal hydroxides or alkanolamines, such as, in particular, ethanolamine, diethanolamine and triethanolamine, depending on whether the copolymers are used in pulverulent or liquid detergents.

The copolymers according to the invention have proved to be excellent sequestering agents, whose calcium-binding capacity in the Hampshire test (turbidity titration), particularly at high temperatures, is substantially higher than that of pentasodium triphosphate and also of the previously known copolymers containing hydroxyl and carboxyl groups. Regarding the prevention of redeposition, an improvement is likewise found in comparison with phosphate, and the inhibiting action is equivalent to, for example, that of carboxymethylcellulose. Moreover, they have a good primary washing action in the detergent formulations.

The copolymers according to the invention are employed in detergent and cleaning formulations in general in amounts of 0.1 to 50% by weight, preferably 0.5 to 20% by weight and very particularly preferably 0.5 to 10% by weight, based on the total weight of the detergent formulation.

The present invention accordingly also relates to detergents and cleaning agents which contain these copolymers in addition to the conventional constituents known to the skilled worker, and the use of these copolymers as, in particular, sequestering agents and antiredeposition agents.

Detergent and cleaning agent formulations according to the invention, which contain 0.1 to 50, preferably 0.5 to 20% by weight, very particularly preferably 0.5 to 10% by weight, based on the total weight, of the copolymer according to the invention, contain, as a rule, as additional constituents, 6 to 25% by weight of surfactants, 15 to 50% by weight of builders and, if appropriate, cobuilders, 5 to 35% by weight of bleaching agents and, if appropriate, bleach activators, and 3 to 30% by weight of assistants, such as enzymes, foam regulators, corrosion inhibitors, optical brighteners, fragrance materials, dyes or formulation assistants, the percentages in each case being based on the total weight.

In their capacity as outstanding sequestering agents and antiredeposition agents, the copolymers according to the invention can also be used in detergent and cleaning formulations, together with the less effective sequestering agents of the prior art, the general properties in respect of sequestering, redeposition inhibition and primary washing action being substantially improved.

Conventional constituents, known to the skilled worker, of detergent formulations, based on the abovementioned general specification, are listed below by way of example:

Suitable surfactants are those which contain in the molecule at least one hydrophobic organic radical and one anionic, zwitterionic or non-ionic group which imparts water solubility. The hydrophobic radical is in general an aliphatic hydrocarbon radical having 8 to 26, preferably 10 to 22 and in particular 12 to 18 C atoms, or an alkylaromatic radical having 6 to 18, preferably 8 to 16, aliphatic C atoms.

Particularly suitable synthetic anionic surfactants are those of the sulfonate, sulfate or synthetic carboxylate type.

Suitable surfactants of the sulfonate type are alkylbenzenesulfonates having 4 to 15 C atoms in the alkyl radical, mixtures of alkene- and hydroxyalkanesulfonates and disulfonates, as obtained, for example, from monoolefins having terminal double bonds or double bonds lying within the chain, by sulfonation with gaseous sulfur trioxide and subsequent alkaline or acidic hydrolysis of the sulfonation products. Alkanesulfonates which are obtainable from alkanes by sulfochlorination or sulfoxidation and subsequent hydrolysis or neutralization, or by addition reactions of bisulfites with olefins, are also suitable. Other useful surfactants of the sulfonate type are the esters of α-sulfo-fatty acids, for example the α-sulfonic acids obtained from hydrogenated methyl or ethyl esters of coconut fatty acid, palm kernel fatty acid or tallow fatty acid.

Suitable surfactants of the sulfate type are the monoesters of sulfuric acid with primary alcohols, for example or coconut fatty alcohols, tallow fatty alcohols or oleyl alcohol, and those with secondary alcohols. Sulfated fatty acid alkanolamines, fatty acid monoglycerides or reaction products of 1 to 4 moles of ethylene oxide with primary or secondary fatty alcohols or alkylphenols are also suitable.

Other suitable anionic surfactants are the fatty acid esters or fatty acid amides of hydroxy- or amino-carboxylic acids or -sulfonic acids, such as, for example, the fatty acid sarcosides, glycolates lactates, taurides or isothionates.

The anionic surfactants can be present in the form of their sodium, potassium and ammonium salts, and as soluble salts of organic bases, such as mono-, di- or triethanolamine.

Examples of non-ionic surfactants (nonionics) which can be used are adducts of 4 to 40, preferably 4 to 20, moles of ethylene oxide with 1 mole of fatty alcohol, alkylphenol, fatty acid, fatty amine, fatty acid amide or alkanesulfonamide. Particularly important are the adducts of 5 to 16 moles of ethylene oxide with coconut fatty alcohols or tallow fatty alcohols, with oleyl alcohol or with secondary alcohols having 8 to 18, preferably 12 to 18, C atoms, and with mono- or dialkylphenols having 6 to 14 C atoms in the alkyl radicals. In addition to these water-soluble nonionics, polyglycol ethers which have 1 to 4 ethylene glycol ether radicals in the molecule and are water-insoluble or not completely water-soluble are also of interest, particularly when they are employed together with water-soluble nonionic or anionic surfactants.

Other non-ionic surfactants which can be used are the water-soluble adducts of ethylene oxide with polypropylene glycol, alkylenediamine polypropylene glycol and alkyl polypropylene glycols having 1 to 10 C atoms in the alkyl chain, which adducts contain 20 to 250 ethylene glycol ether groups and 10 to 100 propylene glycol ether groups, and in which adducts the polypropylene glycol chain acts as a hydrophobic radical.

Non-ionic surfactants of the amine oxide or sulfoxide type can also be used.

The foaming capacity of the surfactants can be increased or reduced by combining suitable types of surfactants. Reduction can also be achieved by adding non-surfactant organic substances.

Examples of suitable builders are: detergent alkalis, such as sodium carbonate and sodium silicate, or complex formers, such as phosphates, or ion exchangers, such as zeolites, and mixtures of these. The object of these builders is to eliminate the ions which originate partly from water and partly from dirt or the textile material and cause hardness, and to reinforce the surfactant action. In addition to the abovementioned builders, the builder can also contain so-called cobuilders. In modern detergents, the object of the cobuilders is to assume some of the properties of the phosphates such as, for example, the sequestering action, the antiredeposition power and the primary and secondary washing action.

For example, water-insoluble silicates, as described in German Laid-Open Application DOS No. 2,412,837, and/or phosphates can be present in the builder. From the group consisting of the phosphates, it is possible to use a pyrophosphate, a triphosphate, higher polyphosphates and metaphosphates. Phosphorus-containing organic complex formers, such as alkanepolyphosphonic acids, amino- and hydroxyalkanepolyphosphonic acids and phosphonocarboxylic acids, are also suitable, as further ingredients for detergents. Examples of such detergent additives are the following compounds: methanediphosphonic acid, propane-1,2,3-triphosphonic acid, butane-1,2,3,4-tetraphosphonic acid, polyvinylphosphonic acid, 1-aminoethane-1,1-diphosphonic acid, 1-amino-1-phenyl-1,1-diphosphonic acid, aminotrismethylenetriphosphonic acid, methylamino- or ethylaminobismethylenediphosphonic acid, ethylenediaminotetramethylenetetraphosphonic acid, ethylenetriaminopentamethylenepentaphosphonic acid, 1-hydroxyethane-1,1-diphosphonic acid, phosphonoacetic and phosphonopropionic acid, copolymers of vinylphosphonic acid and acrylic and/or maleic acid, and their partially or completely neutralized salts.

Other organic compounds which act as complexing agents for calcium and can be present in detergent formulations are polycarboxylic acids, hydroxycarboxylic acids and aminocarboxylic acids, which are generally employed in the form of their water-soluble salts.

Examples of polycarboxylic acids are dicarboxylic acids of the general formula $HOOC-(CH_2)_m-COOH$, where $m=0-8$, and furthermore maleic acid, methylenemalonic acid, citraconic acid, mesaconic acid, itaconic acid, non-cyclic polycarboxylic acids having at least 3 carboxyl groups in the molecule, such as, for example, tricarballylic acid, aconitic acid, ethylenetetracarboxylic acid, 1,1,3-propanetetracarboxylic acid, 1,1,3,3,5,5-pentanehexacarboxylic acid, hexanehexacarboxylic acid, cyclic di- or polycarboxylic acids, such as, for example, cyclopentanetetracarboxylic acid, cyclohexanehexacarboxylic acid, tetrahydrofurantetracarboxylic acid, phthalic acid, terephthalic acid, benzenetri-, -tetra- or -pentacarboxylic acid and mellitic acid.

Examples of hydroxymono- or -polycarboxylic acids are glycolic acid, lactic acid, malic acid, tartronic acid, methyltartronic acid, gluconic acid, glyceric acid, citric acid, tartaric acid and salicylic acid.

Examples of aminocarboxylic acids are glycine, glycylglycine, alanine, asparagine, glutamic acid, aminobenzoic acid, iminodi- or -triacetic acid, hydroxyethyliminodiacetic acid, ethylenediaminetetraacetic acid, hydroxyethylethylenediaminetriacetic acid, diethylenetriaminepentaacetic acid and higher homologs which can be prepared by polymerization of an N-aziridylcarboxylic acid derivative, for example of acetic acid, succinic acid or tricarballylic acid, and subsequent hydrolysis, or by condensation of polyamines having a molecular weight of 500 to 10,000 with salts of chloroacetic acid or bromoacetic acid.

Preferably used cobuilders are polymeric carboxylic acids. These polymeric carboxylic acids include the carboxymethyl ethers of sugars, of starch and of cellulose.

Among the polymeric carboxylic acids, a special role is played by, for example, the polymers of acrylic acid, maleic acid, itaconic acid, mesaconic acid, aconitic acid, methylenemalonic acid, citraconic acid and the like, and the copolymers of the abovementioned carboxylic acids with one another or with ethylenically unsaturated compounds, such as ethylene, propylene, isobutylene, vinyl alcohol, vinyl methyl ether, furan, acrolein, vinyl acetate, acrylamide, acrylonitrile, methacrylic acid, crotonic acid, etc., such as, for example, the 1:1 copolymers of maleic anhydride and ethylene or propylene or furan.

The cobuilders can furthermore contain dirt carriers which keep the dirt, detached from the fibers, in suspension in the liquor, and thus inhibit redeposition. Substances which are suitable for this purpose are water-soluble colloids, generally organic ones, such as, for example, the water-soluble salts or polymeric carboxylic acids, size, gelatine, salts of ether-carboxylic acids or ether-sulfonic acids of starch or of cellulose or salts of acidic sulfates of cellulose or of starch. Water-soluble polyamides containing acidic groups are also suitable for this purpose. Soluble starch preparations, and starch products other than those mentioned above, such as, for example, degraded starch, aldehyde starches, etc., can also be used. Polyvinylpyrrolidone can also be employed.

Bleaching agents are, in particular, hydrogen peroxide and derivatives or compounds providing active chlorine. Among the compounds which serve as bleaching agents and provide $H_2O_2$ in water, sodium borate peroxide hydrates, such as $NaBO_2.H_2O_2.3H_2O$ and $NaBO_2.H_2O_2$, are of particular importance. However, other borates which provide $H_2O_2$ can also be used. These compounds can be partially or completely replaced by other carriers of active oxygen, in particular by peroxyhydrates, such as peroxycarbonates, peroxyphosphates, citrate perhydrates or urea-$H_2O_2$ or melamine-$H_2O_2$ compounds, and by peracid salts providing $H_2O_2$, such as, for example, Caroates, perbenzoates or peroxyphthalates.

It is advisable to incorporate conventional water-soluble and/or water-insoluble stabilizers for the peroxy compounds together with the latter, in amounts of 0.25 to 10% by weight, based on the peroxy compound. Suitable water-insoluble stabilizers are the magnesium silicates $MgO:SiO_2$ which are generally obtained by precipitation from aqueous solutions and have the composition 4:1 to 1:4, preferably 2:1 to 1:2 and in particular 1:1. Other alkaline earth metals used in a corresponding composition can also be used in its place.

In order to achieve a satisfactory bleaching effect when washing at temperatures as low as below 80° C., in particular in the range from 60° to 40° C., it is advantageous to incorporate bleach activators into the detergents, advantageously in an amount of from 5 to 30% by weight, based on the $H_2O_2$-providing compound.

Activators used for per compounds which provide $H_2O_2$ in water are certain N-acyl or O-acyl compounds which form organic peracids with $H_2O_2$, in particular acetyl, propionyl or benzoyl compounds, and carbonates or pyrocarbonates. Compounds which can be used include:
N-diacylated and N,N'-tetraacylated amines, such as, for example,
 N,N,N',N'-tetraacetylmethylenediamine or -ethylenediamine,
 N,N-diacetylaniline and N,N-diacetyl-p-toluidine and 1,3-diacylated hydantoins,
 alkyl-N-sulfonylcarboxamides,
N-acylated cyclic hydrazides, acylated triazoles or urazoles, such as, for example,
 monoacetylmaleic acid hydrazide, O,N,N-trisubstituted hydroxylamines, such as, for example,
 O-benzoyl-N,N-succinylhydroxylamine,
 O-acetyl-N,N-succinylhydroxylamine,
 O-p-methoxybenzoyl-N,N-succinylhydroxylamine,
 O-p-nitrobenzoyl-N,N-succinylhydroxylamine and
 O,N,N-triacetylhydroxylamine,
carboxylic anhydrides, for example
 benzoic anhydride,
 m-chlorobenzoic anhydride,
 phthalic anhydride, 4-chlorophthalic anhydride,
sugar esters, such as, for example, glucose pentaacetate,
imidazolidine derivatives, such as
 1,3-diformyl-4,5-diacetoxyimidazolidine,
 1,3-diacetyl-4,5-diacetoxyimidazolidine or
 1,3-diacetyl-4,5-dipropionyloxyimidazolidine,
acylated glycolurils, such as, for example,
 tetrapropionylglycoluril or
 diacetyldibenzoylglycoluril,
dialkylated 2,5-diketopiperazines, such as, for example,
 1,4-diacetyl-2,5-diketopiperazine,
 1,4-dipropionyl-2,5-diketopiperazine or
 1,4-dipropionyl-3,6-dimethyl-2,5-diketopiperazine, and
acetylation and benzoylation products of propylenediurea
 or 2,2-dimethylpropylenediurea,
 the sodium salt of p-(ethoxycarbonyloxy)-benzoic acid and of p-(propoxycarbonyloxy)-benzenesulfonic acid, and the sodium salts of alkylated or acylated phenolsulfonic acid esters, such as p-acetoxybenzenesulfonic acid, 2-acetoxy-5-nonylbenzenesulfonic acid, 2-acetoxy-5-propylbenzenesulfonic acid or of isononanoyloxyphenylsulfonic acid.

Inorganic or organic compounds providing active chlorine can also be employed as bleaching agents. The inorganic compounds providing active chlorine include alkali metal hypochlorites, which can be used, in particular, in the form of their mixed salts or addition compounds with orthophosphates or condensed phosphates, such as, for example, with pyrophosphates and polyphosphates, or with alkali metal silicates. If the detergents and washing assistants contain monopersulfates and chlorides, active chlorine is formed in aqueous solution.

Particularly suitable organic compounds providing active chlorine are the N-chloro compounds in which one or two chlorine atoms are bonded to a nitrogen atom, the third valence of the nitrogen atoms preferably being occupied by a negative group, in particular by a CO or $SO_2$ group. These compounds include dichloro- and trichlorocyanuric acid and its salts, chlorinated alkylguanides or alkylbiguanides, chlorinated hydantoins and chlorinated melamines.

The following may be listed as examples of additional assistants: suitable foam regulators, especially where surfactants of the sulfonate or sulfate type are used, are capillary-active carboxy- or sulfobetaines and the abovementioned nonionics of the alkylolamide type. For this purpose, fatty alcohols or higher terminal diols are also suitable.

Reduced foaming power, which is desirable particularly for machine washing, is often achieved by combining different types of surfactants, for example sulfates and/or sulfonates with nonionics and/or with soaps. In the case of soaps, foam suppression increases with the degree of saturation and the C number of the fatty acid ester; soaps of saturated $C_{20-24}$-fatty acids are therefore particularly suitable as antifoams.

The non-surfactants foam inhibitors include N-alkylated aminotriazines which may or may not contain chlorine and which are obtained by reacting 1 mole of cyanuric chloride with 2 to 3 moles of a mono- and/or dialkylamine having 6 to 20, preferably 8 to 18, C atoms in the alkyl radical. Propoxylated and/or butoxylated aminotriazines, for example products obtained by an addition reaction of 5 to 10 moles of propylene oxide with 1 mole of melamine and further adduct formation between 10 to 50 moles of butylene oxide and this propylene oxide derivative, have a similar action.

Other suitable non-surfactant foam inhibitors are water-insoluble organic compounds, such as paraffins or haloparaffins having melting points below 100° C., aliphatic $C_{18}$–$C_{40}$-ketones and aliphatic carboxylic acid esters which contain at least 18 C atoms in the acid or in the alcohol radical, or if appropriate in each of these two radicals (for example triglycerides or esters of fatty alcohols with fatty acids); they can be used for inhibiting foam, especially in combinations of surfactants of the sulfate and/or sulfonate type with soaps.

The detergents can contain optical brighteners for cotton and for nylon, polyacrylonitrile or polyester fabric. Examples of suitable optical brighteners are derivatives of diaminostilbenedisulfonic acid for cotton, derivatives of 1,3-diarylpyrazolines for nylon, and quaternary salts of 7-methoxy-2-benzimidazol-2'-ylbenzofuran or of derivatives from the compound class consisting of the 7-[1',2',5'-triazol-1'-yl]-3-[1'',2'',4''-triazol-1''-yl]-coumarines for polyacrylonitrile. Examples of brighteners which are suitable for polyesters are products from the compound class consisting of substituted styrenes, ethylenes, thiophenes, naphthalenedicarboxylic acids or derivatives thereof, stilbenes, coumarines and naphthalimides.

Other assistants or formulation assistants which can be used are those substances which are known to the skilled worker.

The invention now being generally described, the same will be better understood by reference to certain specific examples which are included herein for purposes of illustration only and are not intended to be limiting of the invention of any embodiment thereof, unless specified.

EXAMPLES

I. Preparation of the copolymers according to the invention

Unless stated otherwise the K values are measured on 2% strength by weight solutions of the sodium salts of completely neutralized copolymers in water at 25° C.

1. General method of preparation for solution polymerization 336 parts of completely demineralized water, monomer (b) (see table for amount) and sodium hydroxide (see table for amount) are heated to the boil in a reactor provided with a stirrer. Thereafter, a mixture of 299 parts of completely demineralized water, monomer (a) (see table for amount), monomer (c) and monomer (d) (see table for type and amount) is metered in over 5 hours, and at the same time a solution of 185 parts of completely demineralized water, 4.65 parts of sodium peroxydisulfate and 15.45 parts of 30% strength hydrogen peroxide is metered in over 6 hours. Heating is then continued for a further 2 hours, and, after cooling, the mixture is further neutralized with 50% strength sodium hydroxide solution until a pH value of 8.0, measured on a 10% strength solution, is reached.

Owing to the excessively high viscosity, dilution with water was additionally carried out during the polymerization in the case of Examples 1 to 3 and 12. In Example 13, 45 parts of 30% strength hydrogen peroxide (instead of 15.45 parts) were employed.

The Examples in Table 1 below are carried out in accordance with this method. In the table, parts mean parts by weight, MSA denotes maleic anhydride, AS denotes acrylic acid, MAS denotes methacrylic acid and IS denotes itaconic acid. The solids content is determined by drying for 2 hours at 150° C. in an oven.

TABLE 1

| Example No. | Monomer (b) parts | | Sodium hydroxide in the reactor (initially taken) [parts] | Monomer (a) parts | | Monomer (c) parts | | Monomer (d) parts | Solids content of the Na salt [%] | K value of the Na salts |
|---|---|---|---|---|---|---|---|---|---|---|
| 1 | 137.1 | MSA | 100.7 | 162.2 | AS | 139.1 | butane-1,4-diol monoacrylate | — | 30.7 | 75.3 |
| 2 | 117.55 | MSA | 86.4 | 139.2 | AS | 185.5 | butane-1,4-diol monoacrylate | — | 28.2 | 79.8 |
| 3 | 97.96 | MSA | 72.0 | 115.95 | AS | 231.9 | butane-1,4-diol monoacrylate | — | 22.0 | 79.5 |
| 4 | 137.1 | MSA | 100.7 | 162.3 | AS | 139.1 | hydroxypropyl acrylate | — | 36.9 | 48 |
| 5 | 117.55 | MSA | 86.4 | 139.2 | AS | 185.5 | hydroxypropyl acrylate | — | 36.5 | 47.3 |
| 6 | 97.96 | MSA | 72.0 | 115.95 | AS | 231.9 | hydroxypropyl acrylate | — | 35.6 | 47.4 |
| 7 | 78.3 | MSA | 57.5 | 92.68 | AS | 278.0 | hydroxypropyl acrylate | — | 35.9 | 52.6 |
| 8 | 58.77 | MSA | 43.18 | 69.57 | AS | 324.66 | hydroxypropyl acrylate | — | 35.6 | 51.0 |
| 9 | 39.18 | MSA | 28.78 | 46.38 | AS | 371.0 | hydroxypropyl acrylate | — | 35.0 | 49.5 |
| 10 | 117.55 | MSA | 86.4 | 131.2 | AS | 185.5 | hydroxyethyl acrylate | — | 37.0 | 62 |
| 11 | 97.96 | MSA | 72.0 | 115.95 | AS | 231.9 | hydroxyethyl acrylate | — | 36.3 | 75 |
| 12 | 78.3 | MSA | 57.5 | 92.68 | AS | 278.0 | hydroxyethyl acrylate | — | 31.7 | 78 |
| 13 | 58.75 | MSA | 47.6 | 69.57 | AS | 324.66 | hydroxyethyl acrylate | — | 35.8 | 56.6 |

TABLE 1-continued

| Example No. | Monomer (b) parts | | Sodium hydroxide in the reactor (initially taken) [parts] | Monomer (a) parts | | Monomer (c) parts | | Monomer (d) parts | | Solids content of the Na salt [%] | K value of the Na salts |
| --- | --- | --- | --- | --- | --- | --- | --- | --- | --- | --- | --- |
| 14 | 58.75 | MSA | 47.6 | 69.57 | AS | 278.0 | hydroxypropyl acrylate | 46.34 | vinyl acetate | 35.9 | 46.7 |
| 15 | 78.3 | MSA | 57.5 | 92.68 | AS | 231.9 | hydroxypropyl methacrylate | 23.17 23.17 | acrylonitrile 2-acryl-amido-2-methylpropylsulfonic acid | 36.8 | 64.5 |
| 16 | 19.59 | MSA | 14.39 | 23.19 | AS | 417.42 | hydroxypropyl acrylate | — | — | 35.4 | 42.8 |
| 17 | 78.3 | MSA | 57.5 | 92.68 | AS | 278.0 | hydroxypropyl methacrylate | | | 37.9 | 46.0 |
| 18 | 58.77 | MSA | 81.5 | 46.33 | AS | 115.8 | hydroxypropyl acrylate | — | | 36.2 | 34.0 |
|  | 69.50 | JS |  | 46.33 | MAS | 115.8 | hyroxypropyl methacrylate | | | | |
| 19 | 58.7 | MSA | 40 | 185.20 | AS | 208.35 | hydroxyethyl monomaleate | — | | 35.8 | 31.5 |
| 20 | 115.95 | IS | 80 | 115.95 | MAS | 231.9 | hydroxypropyl acrylate | — | | 36.7 | 48.5 |

The hydroxypropyl acrylate used is an isomer mixture consisting of 67% by weight of 2-hydroxyprop-1-yl acrylate and 33% by weight of 1-hydroxyprop-2-yl acrylate. Example 16 is a Comparative Example not embraced by the claim.

EXAMPLE 21

To hydrolyze the vinyl acetate groups, the copolymer from Example 14, in the form of the solution obtained in the polymerization, is brought to a pH value of 2.5 with 50% strength sulfuric acid and heated for 2 hours at 80° C. Thereafter, neutralization with sodium hydroxide solution is carried out until the pH value reaches 8, measured on a 10% strength solution. Analysis by IR spectroscopy shows that 95% of the vinyl acetate units have been converted to vinyl alcohol units. The solids content of the solution is 34.2%. The K value of the sodium salt is 42.3.

EXAMPLE 22

Preparation by suspension polymerization

In a reactor, 500 parts of cyclohexane, 25 parts of maleic anhydride and 5 parts of polyethyl vinyl ether having a K value of 50, measured in a 1% strength solution in cyclohexanone at 25° C., are heated at the boil, at about 83° C., while stirring, and 75 parts of anhydrous acrylic acid and 150 parts of hydroxypropyl acrylate (mixture of 67% by weight of 2-hydroxyprop-1-yl acrylate and 33% by weight of 1-hydroxyprop-2-yl acrylate) and a solution of 2.4 parts of tert.-butyl per-2-ethylhexanoate in 60 parts of cyclohexane are metered in over 3 hours. Thereafter, the mixture is heated under reflux for a further hour, a further 1.2 parts of tert.-butyl per-2-ethylhexanoate are added, and heating under reflux continued for a further 3 hours. After cooling, the fine-particled suspension is centrifuged, and the copolymer is then dried at 80° C. in a vacuum drying oven. The yield of a very fine, white polymer is 235 parts. This is milled in a ball mill with 55 parts of powdered sodium hydroxide for 48 hours. The K value of the water-soluble sodium salt of the copolymer is 63.

EXAMPLE 23

Preparation by precipitation polymerization

In a reactor, 102 parts of maleic anhydride, 550 parts of o-xylene, 1 part of polymethyl vinyl ether having a K value of 40, measured in a 1% strength solution in cyclohexanone at 25° C., and 1 part of polyethyl vinyl ether having a K value of 50, measured in a 1% strength solution in cyclohexanone at 25° C., are heated to 100° C. under nitrogen, while stirring, and a mixture of 34 parts of anhydrous acrylic acid, 204 parts of hydroxypropyl acrylate (mixture of 67% by weight of 2-hydroxyprop-1-yl acrylate and 33% by weight of 1-hydroxyprop-2-yl acrylate), 50 parts of o-xylene and 3.4 parts of tert.-butyl perethylhexanoate is fed in over 4 hours. Thereafter, a solution of 50 parts of o-xylene and 3.4 parts of di-tert.-amyl peroxide is added, and the mixture is heated at the boil, at about 138° C., and is allowed to continue reacting for 2 hours. The thin suspension is dried in a paddle drier to give a white powder. The yield is 338 g. The polymer powder is milled in a ball mill with 92 parts of powdered sodium hydroxide for 48 hours. The K value of the sodium salt of the copolymer is 36.

EXAMPLE 24

Preparation by solution polymerization in methyl ethyl ketone

In a reactor, 400 parts of methyl ethyl ketone and 117.5 parts of maleic anhydride are heated to the boil, at about 95° C., under nitrogen and while stirring, after which a mixture of 139.2 parts of acrylic acid and 185.5 parts of hydroxypropyl acrylate is metered in uniformly at the boil in the course of 5 hours, and at the same time a solution of 10 parts of 2,2'-azobis-(isobutyronitrile), dissolved in 100 parts of methyl ethyl ketone, is metered in uniformly at the boil in the course of 7 hours. Heating under reflux is then continued for a further 2 hours, the mixture is diluted with 500 parts of water and the methyl ethyl ketone is expelled by passing in steam until the boiling point reaches 100° C. The mixture is then cooled to 40° C. and is neutralized by adding 50% strength sodium hydroxide solution until a pH value of 8, measured on a 10% strength solution, is reached. The solids content is 39.6%; the K value of sodium salt is 58.9.

II. Use Examples

A. Determination of the whiteness

Copolymers according to the Examples of Table 1 are employed as simplified heavy-duty detergent formulations, and the white-washing action is determined on WFK fabric (standard soiled fabric from Wäschereiforschung Krefeld). The washing apparatus used was a Launder-O-Meter.

Test conditions

Temperature: 40° to 95° C.
Liquor ratio: 25:1
Fabric: WFK cotton fabric
Washing time: 45 minutes
Hardness of the water: 16°d
pH value: 10.5
Detergent concentration: 7 g/l Detergent composition (% by weight)

10% of $C_{12}$-alkylbenzenesulfonate (Na salt), 50% strength
5% of $C_{16}/C_{18}$-fatty alcohol+11 EO (ethylene oxide)
20% of sodium perborate tetrahydrate
7% of sodium silicate
2% of carboxymethylcellulose Na salt
3% of sodium stearate
3% of nitrilotriacetic acid Na salt
15% of pentasodium triphosphate
3.5% of magnesium sulfate heptahydrate
2.5% of the copolymer according to the invention
Remainder to 100%: sodium sulfate (anhydrous)
The test results are shown in Table 2.

TABLE 2

| Copolymer according to Table 1 | Whiteness determined on WFK cotton fabric Whiteness measured on an Elrepho (Zeiss) apparatus (diffuse reflectance) |
|---|---|
| Example 1 | 73.3 |
| Example 2 | 73.5 |
| Example 5 | 73.6 |
| Example 7 | 73.8 |
| Example 11 | 73.5 |
| Comparative experiments | |
| Prod. 5, German Laid-Open Application DOS 2,616,261 | 72.1 |
| Prod. 6, German Laid-Open Application DOS 2,616,261 | 70.9 |
| Pentasodium triphosphate | 69.5 |

From the values in this table, it can be seen that the polymers according to the invention have a better white effect (primary washing action) than pentasodium triphosphate and the products of the prior art, which were also tested.

B. Determination of the redeposition-inhibiting action

By repeated washing in the presence of a large amount of dirt, the redeposition-inhibiting action of the copolymers in comparison with pentasodium triphosphate was tested on the basis of the whiteness obtained. Detergent composition as described under A Test conditions Temperature: 60° C.
Liquor ratio: 10:1
Fabric:
  10 g of cotton terry fabric
  5 g of cotton polyester fabric
  5 g of polyester fabric
  2.5 g of soiled cotton fabric
  2.5 g of soiled polyester fabric Washing time: 30 minutes at from 35° to 60° C.
Hardness of the water: 19.6°d
pH value: 10.5
Detergent concentration: 8 g/l
Washing was repeated 5 times, and the soiled fabric was replaced after each wash.
The test results are summarized in Table 3.

TABLE 3

| | Redeposition-inhibiting action | | | |
|---|---|---|---|---|
| | Whiteness (% diffuse reflectance measured on an Elrepho apparatus from Zeiss) Number of washes: 5 | | | |
| Copolymer according to Table 1 | Test fabric: PES | PES/BW 67/33 | Terry | Mean value |
| Example 5 | 80.2 | 66.1 | 61.3 | 69.2 |
| Example 7 | 79.5 | 65.6 | 61.5 | 68.9 |
| Example 10 | 81.0 | 68.5 | 62.1 | 70.5 |
| Example 15 | 79.8 | 64.2 | 60.6 | 68.2 |
| without copolymer | 75.5 | 51.5 | 48.5 | 58.5 |

The table shows clearly how the redeposition-inhibiting action of a formulation without a copolymer according to the invention is increased by adding the latter.

C. Calcium-binding and magnesium-binding capacities

The calcium-binding capacity was determined by turbidity titration with Ca acetate. To do this, 1 g of the complex former to be tested is dissolved in 100 ml of distilled water, and 10 ml of 2% strength Na carbonate solution are then added. The pH value of this solution is brought to 11, and is kept constant during the titration. The titration is then carried out using 4.4% strength Ca acetate solution until a pronounced constant turbidity occurs. The Ca acetate solution is added at intervals of 30 s, in an amount of 1 ml each time. 1 ml of Ca acetate solution consumed corresponds to 25 mg of Ca carbonate. The result is stated in mg of Ca carbonate per gram of complex former.

The determination of the Mg-binding capacity is carried out analogously.

The test results are summarized in Table 4.

TABLE 4

| Calcium-binding and magnesium-binding capacities | | | | |
|---|---|---|---|---|
| Copolymer according to Table 1 | $CaCO_3$ mg/g | | $MgCO_3$ mg/g | |
| | 25° C. | 90° C. | 25° C. | 90° C. |
| Example 1 | 750 | 575 | 693 | 525 |
| Example 2 | 975 | 625 | 651 | 609 |
| Example 3 | >1250 | 724 | 609 | 651 |
| Example 4 | 874 | 625 | 651 | 566 |
| Example 5 | >1250 | 775 | 777 | 566 |
| Example 6 | >1250 | 925 | 777 | 777 |
| Example 7 | >1250 | >1250 | 819 | 777 |
| Example 8 | >1250 | 825 | 734 | 651 |
| Example 11 | 1200 | 724 | 734 | 693 |
| Example 12 | >1250 | 825 | 651 | 609 |
| Example 14 | 1200 | 925 | 777 | 777 |
| Comparative Examples | | | | |
| Example 16 | 225 | 25 | 441 | 200 |
| Product according to Example 4 German Laid-Open Application DOS 2,616,261 | >1250 | 100 | | |
| Product according to Example 7 German Laid-Open Application DOS 2,616,261 | >1250 | 150 | | |
| Pentasodium triphosphate | 325 | 175 | 483 | 315 |
| Product according to Example 2 U.S. Patent Specification 4,314,044 | 896 | 214 | 632 | 318 |

TABLE 4-continued

| Copolymer according to Table 1 | Calcium-binding and magnesium-binding capacities | | | |
|---|---|---|---|---|
| | CaCO$_3$ mg/g | | MgCO$_3$ mg/g | |
| | 25° C. | 90° C. | 25° C. | 90° C. |
| Example 18 | 1250 | 825 | 861 | 819 |
| Example 19 | 450 | 400 | 441 | 210 |
| Example 20 | 1250 | 875 | 744 | 735 |
| Example 21 | 1250 | 675 | 672 | 651 |
| Example 22 | 1250 | 775 | 756 | 588 |

From the values in this table, it can clearly be seen how the copolymers according to the invention increase the calcium and magnesium sequestration. An important criterion with regard to the choice of sequestering agents for ions which cause hardness is the sequestration at elevated temperature (which corresponds more closely to practice than that at room temperature). Compared with the prior art, this value is surprisingly high for the copolymers according to the invention.

A few general recipes for detergent formulations using the copolymers according to the invention are indicated below:

Formulation 1

5% of dodecylbenzenesulfonate, Na salt, 100% strength
3% of C$_{13}$–C$_{15}$-fatty alcohol+10 moles of ethylene oxide, 100% strength
3% of C$_{18}$–C$_{22}$ fatty acid Na salt
20% of pentasodium triphosphate
7% of sodium metasilicate.5H$_2$O
20% of sodium perborate
5% of nitrilotriacetic acid Na salt
2% of carboxymethylcellulose Na salt
2% of Na salt of acrylic acid/maleic acid copolymer
3% of the polymer according to the invention, according to Example 1
0.5% of an optical brightener of the diaminostilbenedisulfonic acid type
0.7% of enzymes of the protease type (alcalase)
Remainder to 100%: sodium sulfate (anhydrous)

Formulation 2

6% of dodecylbenzenesulfonate, Na Salt, 100% strength
4% of C$_{13}$–C$_{15}$-fatty alcohol+7 EO
2% of antifoam of the silicone type
20% of pentasodium triphosphate
5% of sodium metasilicate.5H$_2$O
15% of sodium perborate
3% of cold bleach activator (tetraacetylethylenediamine)
4% of nitrilotriacetic acid Na salt
2% of a phosphonate (eg. pentasodium ethylenediaminetetramethylenephosphonate)
2% of the Na salt of an acrylic acid/methyl vinyl ether copolymer
2% of the Na salt of an acrylic acid/maleic acid copolymer
4% of the polymer according to the invention, according to Example 5
0.5% of an optical brightener of the diaminostilbenedisulfonic acid type
0.7% of enzymes of the protease type (alcalase)
Remainder to 100%: sodium sulfate (anhydrous)

Formulation 3

8% of C$_{13}$–C$_{15}$-fatty alcohol+10 EO
2% of C$_{13}$–C$_{15}$-fatty alcohol+3 EO
10% of sodium metasilicate
10% of Na$_2$CO$_3$
20% of sodium perborate
1% of magnesium sulfate
25% of pentasodium triphosphate
0.5% of tetrasodium ethylenediaminetetraacetate
1.5% of a phosphonate (hydroxyethanediphosphonic acid)
1.5% of carboxymethylcellulose Na salt
4% of the copolymer according to the invention, according to Example 11
0.5% of an optical brightener of the diaminostilbenedisulfonic acid type
0.7% of enzymes of the protease type (alcalase)
Remainder to 100%: sodium sulfate (anhydrous)

What is claimed as new and desired to be secured by Letters Patent of the United States is:

1. Copolymer consisting of
 (a) 5 to 40% by weight of at least one monoethylenically unsaturated monocarboxylic acid having 3 to 10 carbon atoms selected from the group consisting of acrylic acid, methacrylic acid, vinylacetic acid, allylacetic acid, propylideneacetic acid, ethylidenepropionic acid, α-ethylacrylic acid, β,β-dimethylacrylic acid and mixtures thereof,
 (b) 5 to 40% by weight of at least one monoethylenically unsaturated dicarboxylic acid having 4 to 6 carbon atoms,
 (c) 30 to 80% by weight of at least one hydroxyalkyl ester, having 2 to 6 C atoms in the hydroxyalkyl group, of monoethylenically unsaturated mono- and/or dicarboxylic acids according to (a) and/or (b), and
 (d) 0 to 10% by weight of one or more monoethylenically unsaturated monomers which are free of carboxyl groups and are copolymerizable with the monomers (a), (b) and (c),
 the percentages in each case being based on the weight of the monomers,
 and salts of the copolymers.

2. Copolymer according to claim 1, consisting of
 (a) 10 to 30% by weight of acrylic acid or methacrylic acid and mixtures of these,
 (b) 10 to 30% by weight of maleic acid or itaconic acid and mixtures of these, and
 (c) 40 to 70% by weight of hydroxypropyl(meth)acrylate, hydroxyethyl(meth)acrylate and/or butanediol mono(meth)acrylate, and its salts.

3. Detergents and cleaning agents containing at least one copolymer and/or its salt according to claim 1 or 2.

4. Detergents and cleaning agents containing at least one copolymer and/or its salt according to claim 1 or 2, in an amount of 0.5 to 20% by weight, based on the total weight.

5. Copolymers according to claim 1 having K values of 8 to 100.

6. Copolymers according to claim 1 having K values of 20 to 80.

* * * * *